(12) United States Patent
Mott et al.

(10) Patent No.: US 8,607,968 B2
(45) Date of Patent: Dec. 17, 2013

(54) CONVEYOR ROLLER SERVICING APPARATUS

(71) Applicants: George T. Mott, Alburtis, PA (US); Michael B. Heenan, Bethlehem, PA (US); Leroy C. Williams, Hellertown, PA (US)

(72) Inventors: George T. Mott, Alburtis, PA (US); Michael B. Heenan, Bethlehem, PA (US); Leroy C. Williams, Hellertown, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 0 days.

(21) Appl. No.: 13/752,906

(22) Filed: Jan. 29, 2013

(65) Prior Publication Data
US 2013/0140145 A1    Jun. 6, 2013

Related U.S. Application Data

(63) Continuation of application No. 12/964,037, filed on Dec. 9, 2010, now Pat. No. 8,387,781, which is a continuation-in-part of application No. 12/793,933, filed on Jun. 4, 2010, now Pat. No. 8,328,006.

(51) Int. Cl.
*B65G 39/12*    (2006.01)

(52) U.S. Cl.
USPC ............ 198/861.1; 198/842; 198/860.1; 198/866

(58) Field of Classification Search
USPC ............ 198/810.03, 842, 860.1, 861.1, 866
See application file for complete search history.

(56) References Cited

U.S. PATENT DOCUMENTS

| | | | | | |
|---|---|---|---|---|---|
| 809,227 | A | * | 1/1906 | Steckel | 198/826 |
| 1,276,724 | A | * | 8/1918 | Cowley | 198/842 |
| 1,530,499 | A | * | 3/1925 | Knode | 198/830 |
| 2,693,269 | A | * | 11/1954 | Bentley | 198/842 |
| 3,877,568 | A | * | 4/1975 | Breiling et al. | 198/842 |
| 4,513,859 | A | * | 4/1985 | Long et al. | 198/842 |
| 5,027,940 | A | * | 7/1991 | Woodward | 198/500 |
| 5,056,655 | A | * | 10/1991 | Justice | 198/812 |
| 5,109,937 | A | * | 5/1992 | Kipp | 177/145 |
| 5,117,970 | A | * | 6/1992 | Gibbs | 198/842 |

(Continued)

FOREIGN PATENT DOCUMENTS

| | | |
|---|---|---|
| JP | 06-056023 U | 8/1994 |
| JP | 08-067320 A | 3/1996 |

(Continued)

OTHER PUBLICATIONS

Korean Intellectual Property Office, "International Search Report—Application . PCT/US20111038587", Jan. 9, 2012, 3 pages.

(Continued)

*Primary Examiner* — Douglas Hess
(74) *Attorney, Agent, or Firm* — Caesar, Rivise, Bernstein, Cohen & Pokotilow, Ltd.

(57) ABSTRACT

A mounting apparatus for a return roller is provided. The mounting apparatus is positioned beneath a return side of a conveyor belt, the return side of the conveyor belt having a near side along one edge of the return side of the conveyor belt and a far side along an opposite edge of the return side of the conveyor belt. The mounting apparatus has a return roller support structure and a return roller supported on the return roller support structure. The return roller support structure is slidable from the mounting apparatus in a direction towards the near side of the return side of the conveyor belt.

15 Claims, 14 Drawing Sheets

(56) References Cited

U.S. PATENT DOCUMENTS

| | | | | |
|---|---|---|---|---|
| 5,590,757 | A | * | 1/1997 | Walter et al. ............... 198/812 |
| 5,645,158 | A | * | 7/1997 | Polka et al. ............... 198/812 |
| 5,680,925 | A | * | 10/1997 | Gallagher et al. ......... 198/861.1 |
| 5,988,360 | A | * | 11/1999 | Mott ............... 198/823 |
| 6,095,320 | A | * | 8/2000 | DeMong et al. ............... 198/812 |
| 6,237,753 | B1 | * | 5/2001 | Walter et al. ............... 198/824 |
| 6,269,943 | B1 | * | 8/2001 | Mott ............... 198/823 |
| 6,273,241 | B1 | * | 8/2001 | Bonnet ............... 198/790 |
| 6,427,828 | B1 | * | 8/2002 | East et al. ............... 198/826 |
| 6,948,609 | B2 | * | 9/2005 | Finger et al. ............... 198/499 |
| 7,083,040 | B2 | * | 8/2006 | Finger et al. ............... 198/499 |
| 7,621,391 | B2 | * | 11/2009 | Matters et al. ............... 198/825 |
| 7,762,387 | B2 | * | 7/2010 | Dunn ............... 198/823 |
| 7,950,520 | B2 | * | 5/2011 | Mott ............... 198/826 |
| 7,971,705 | B2 | | 7/2011 | Jabber et al. |
| 8,328,006 | B2 | * | 12/2012 | Mott ............... 198/861.1 |
| 8,387,781 | B2 | * | 3/2013 | Mott et al. ............... 198/861.1 |

FOREIGN PATENT DOCUMENTS

| | | |
|---|---|---|
| JP | 09-278150 A | 10/1997 |
| KR | 20-0227825 Y1 | 6/2001 |
| KR | 10-0847031 B1 | 7/2008 |
| WO | 2006060862 A1 | 6/2006 |

OTHER PUBLICATIONS

ASGCO Mfg., Inc., "Slide-lers, Conveyor Belt Idlers", prior to Jun. 4, 2010, 3 pages.

ASGCO Mfg., Inc. "One Side Slideler drawing", prior to May 27, 2010, 3 pages.

ASGCO Mfg., Inc. "Load Zone Support Systems", 2009, 4 pages.

Martin Engineering Company, "Trac-Mount Idlers/Centralizing Idlers", Oct. 1, 1992, 1 page.

Saguaro Conveyor Equipment, Inc., Apr. 2000, 2 pages.

* cited by examiner

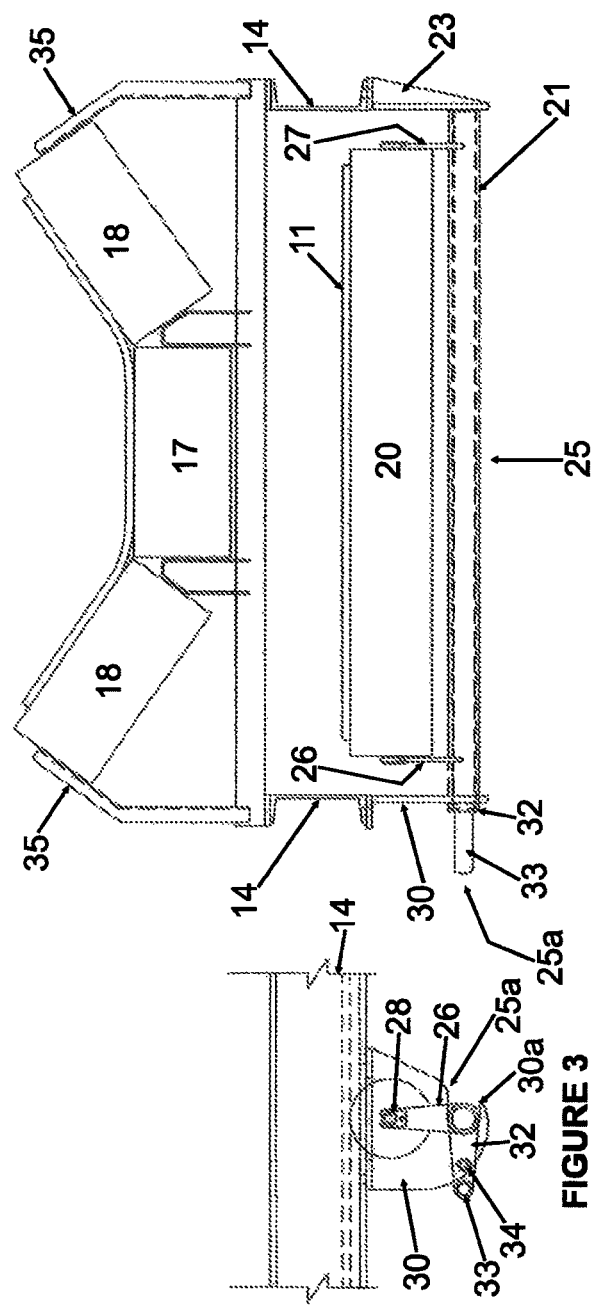

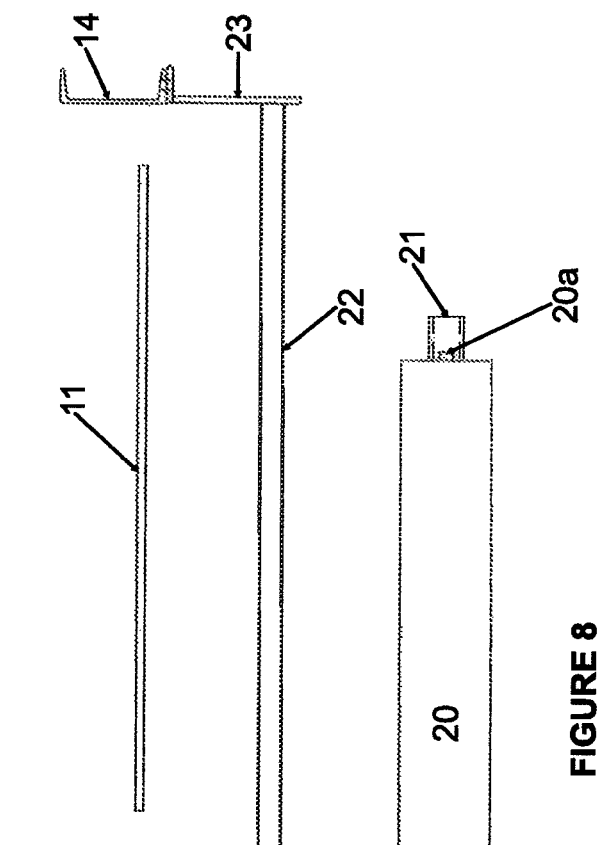
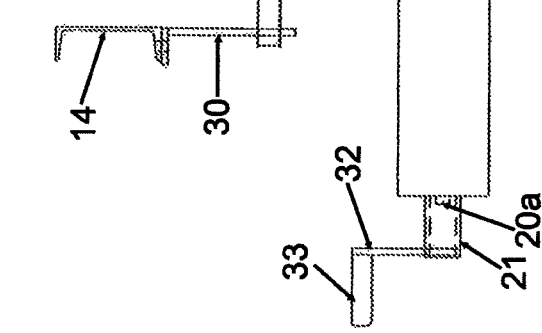
FIGURE 8
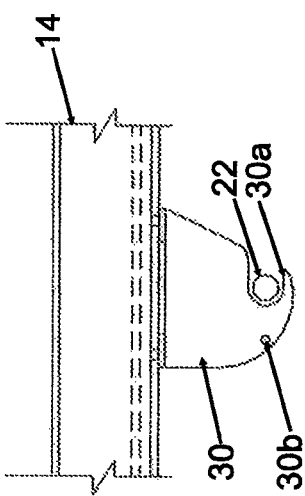
FIGURE 9

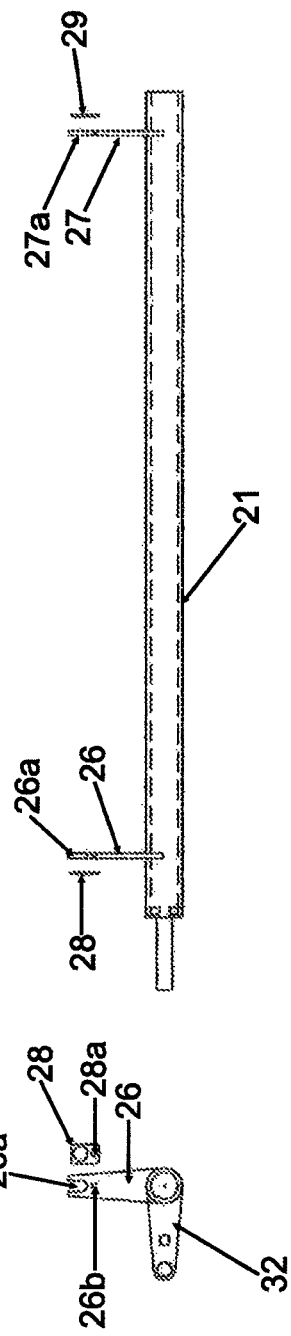

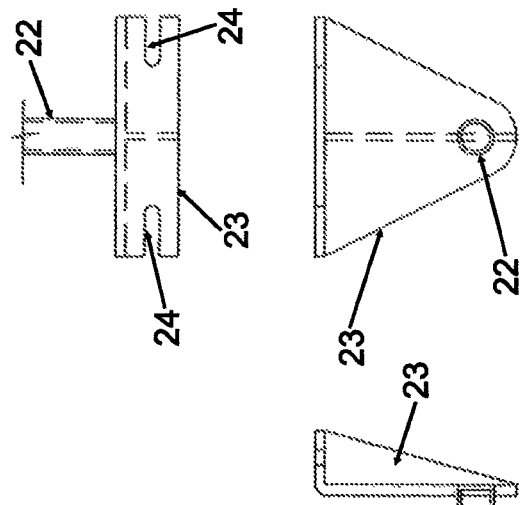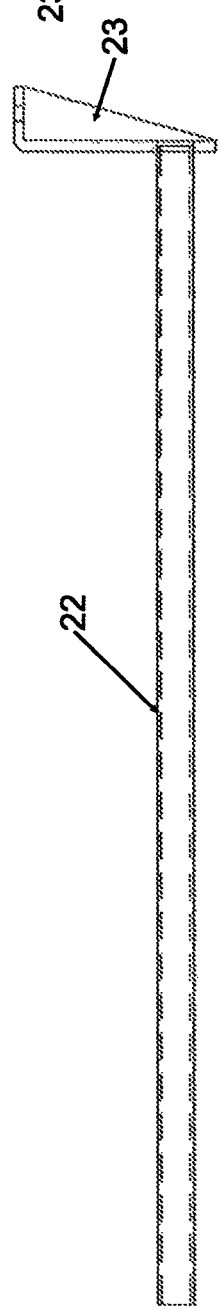

CONVEYOR ROLLER SERVICING APPARATUS

This application is a continuation of U.S. patent application Ser. No. 12/964,037 filed Dec. 9, 2010, now U.S. Pat. No. 8,387,781, which is a continuation-in-part of U.S. patent application Ser. No. 12/793,933, now U.S. Pat. No. 8,328,006, both of which are hereby incorporated herein by reference in their entireties.

The present invention relates to a conveyor roller servicing apparatus and, in particular to an arrangement for servicing the rollers of a conveyor belt, for example, a conveyor belt of the sort often employed for handling particulate material and the like.

The movement of material in the form of aggregate and particulate material has for many years been accomplished through trough-type conveyors which operate in relatively severe conditions and require periodic maintenance for changing and lubricating rollers to prevent belt damage. Typically, the rollers on conveyor belts need to be disconnected from mounting brackets on opposite sides of the conveyor support frame, when it is desired to change or repair the rollers. The return roller, which contacts the underside of the conveyor belt, operates in a hostile environment where the conveyor belt is used in applications where aggregate and particulate material are conveyed by the belt. The return roller, of course, operates on the return or dirty side of the belt and the hostile conditions thereat can involve dirt, abrasive material, and corrosive material, such as salt and moisture, which can affect the bearings of the return roller and cause the return roller to stop or resist rotating. Hence, changing of the return roller is required to prevent damage to the belt.

On many conveyor belt systems, access to the mounting brackets for the rollers is limited due to the conveyor system being elevated above ground and a catwalk being located on only one side of the conveyor system. Also, space for servicing the conveyor system is normally not available on both sides of the conveyor belt system and it would be expensive to duplicate the catwalk and platforms on both sides of the conveyor system for servicing the rollers. Generally, maintenance personnel in order to change or work on the rollers have used safety lanyards or special safety equipment and have had to work out on the framework of a truss to gain access to the far side of the conveyor belt system where no catwalk is available. Furthermore, since safety procedures and standards have become very strict, it has become more tedious and time consuming to safely gain access to the far side of the conveyor in order to replace or service the conventional roller, especially on elevated conveyor belt systems.

Accordingly, there is a need for a roller arrangement that may be serviced and/or replaced from one side of a conveyor system.

The present arrangement provides a mounting apparatus for rollers on a conveyor system that holds the roller in proper engagement with the conveyor belt, e.g., when the conveyor system is operating under normal conditions. When it is desired or necessary to replace or otherwise service the roller, the present arrangement provides an apparatus to permit disengagement of the roller from its normal operating position and its removal from the conveyor system from one side of the conveyor system, e.g., the near side, without the need to access the roller from the far side of the conveyor support structure. The present arrangement maintains the rigid support for the roller in the conveyor belt mounting arrangement while permitting easy removal of the roller from one side of the conveyor system.

According to another aspect, a conveyor belt support for a conveyor may comprise: a mandrel mountable to the far side of the conveyor and extending transversely toward the near side thereof; a member mountable to the mandrel from the near side of the conveyor may slide thereon and may rotate about the mandrel; and a roller supported by the member, wherein the roller is transverse to the conveyor belt when the member is mounted to the mandrel, wherein rotating the member in a first direction moves the roller to an operating position for supporting the conveyor belt and rotating the member in a second direction moves the roller to a position wherein the member and roller are removable from the support mandrel.

BRIEF DESCRIPTION OF THE DRAWING

The foregoing summary, as well as the following detailed description of the preferred embodiments of the present arrangement, and the drawings furnished herewith illustrate the present arrangement. The detailed description of the preferred embodiment(s) will be more easily and better understood when read in conjunction with the FIGURES of the Drawing which include:

FIG. 2 is an enlarged sectional view of the example conveyor assembly of FIG. 1;

FIG. 3 is a fragmentary side elevational view of the left side of the example conveyor assembly of FIG. 2;

FIG. 4 is a fragmentary side elevational view of the right side of the example conveyor assembly of FIG. 2;

FIG. 8 is a further view of the example return roller and its support assembly similar to FIG. 7 but showing the return roller beneath its support assembly;

FIG. 9 is a side elevational view of the example return roller of FIG. 8 showing the support structure for the return roller in FIG. 8, but with the return roller structure removed therefrom;

FIG. 10 is a view of the example return roller mounting tubing and brackets for support of the return roller and retainers for the roller shaft;

FIG. 11 is an exploded side elevational view of the example return roller mounting tube, bracket and retainer of FIG. 10;

FIG. 15 is a view of the example mandrel for supporting the return roller structure with the mandrel attached to its support bracket;

FIG. 16 is a side elevational view of the example support bracket and mandrel of FIG. 15;

FIG. 17 is a top elevational view of the example bracket and mandrel of FIG. 15;

Figure 1:
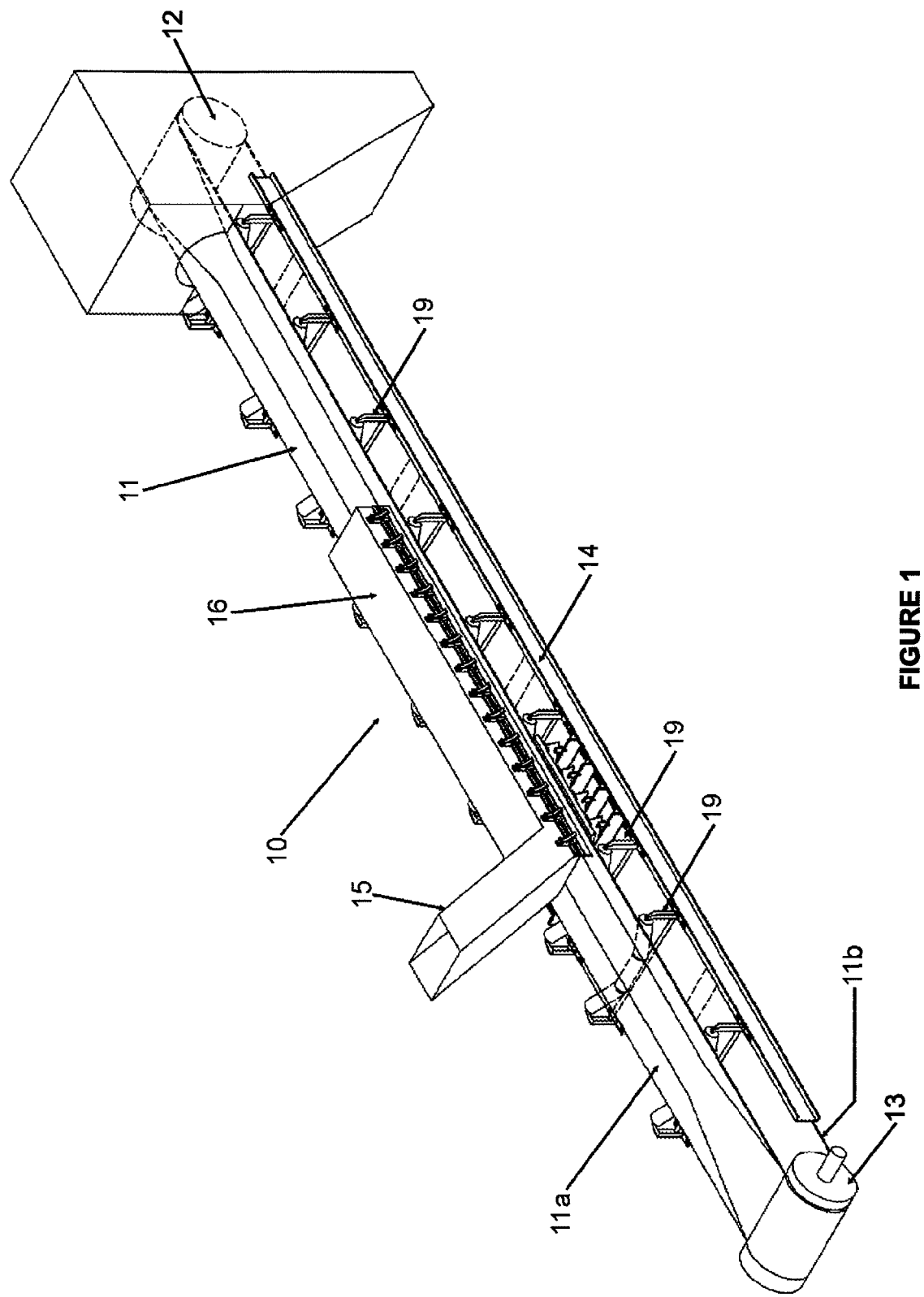
FIG. 1 is the perspective view of an example conveyor assembly for conveying material embodying the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity; any value stated is given by way of example.

DESCRIPTION OF THE PREFERRED EMBODIMENT(S)

The present arrangement provides a mounting apparatus for return rollers on a conveyor system 10 that holds the return roller in proper engagement with the conveyor belt 11 when the conveyor system 10 is operating under normal conditions. When it is desired or necessary to replace or otherwise service the return roller, the present arrangement permits and facilitates disengagement of the return roller from its normal operating position to a servicing position, and removal from the conveyor system 10 from one side of the conveyor belt, e.g., the near side, without the need to access the return roller from the far side of the conveyor system 10. The present arrangement maintains the rigid support for the return roller in the conveyor belt mounting arrangement while permitting easy removal of the return roller from one side of the conveyor system 10.

Referring now to the drawings, FIG. 1 illustrates an endless conveyor belt assembly generally designated 10. The endless conveyor belt assembly for illustration, includes an endless troughing conveyor belt 11 extending around a head pulley 12 and a tail pulley 13 providing a carry side 11a and a return side 11b for the belt, which is supported by a belt support frame 14. There is provided along the belt support frame 14, a plurality of belt supports 19 supporting the conveyor belt 11 between the head pulley 12 and the tail pulley 13. The conveyor belt 11 is designed to transport aggregate or particulate material that is loaded onto the conveyor belt through chute 15 in loading zone 16. The conveyor belt 11 carries the material away from the loading zone 16 and discharges the material at the head pulley 12 area. As shown in the sectional view of FIG. 2, the carry run 11a of the conveyor belt 11 is supported by a series of rollers 19. More specifically, at each belt support station 19 along the carry run of the conveyor 10, the conveyor belt 11 is supported by a central roller 17 and a pair of wing rollers, each designated 18, extending upwardly along the edges of the conveyor belt 11 to provide a troughing arrangement for the edges of the conveyor belt 11. The troughing arrangement prevents the aggregate materials from spilling over the edges of the conveyor belt as the material is transported along the conveyor belt.

Generally, the conveyor belt 11 is formed of a heavy duty material, such as a fabric made of nylon, polyester, Kevlar®, fiber glass or other such material, and may be covered in rubber. As noted the marginal sides of the belt 11 are canted upwardly to form a trough configuration preventing heavy aggregate material, such as stones or the like or particulate material from spilling from the belt. It is also noted that, after the material has settled on the belt from the loading zone 16, it may not be necessary to maintain the troughing of the belt to the discharge area. The central and wing roller 17, 18 arrangements are mounted for rotation to formed brackets or stanchions 35 attached to the belt support frame 14 at intervals along the underside of the belt 11 to physically support the belt and maintain the desired location of the belt between the belt supports 19. Each belt support is similarly constructed as indicated in FIG. 1.

As shown in FIGS. 2, 3 and 4, a return roller 20 is supported by the belt support structure frame 14 beneath the central roller and wing rollers 17 and 18, respectively. The rollers 17, 18, 20 may be formed of steel or, alternatively, may be formed of an impact absorbing material, such as, rubber, plastic, urethane or a combination of steel and an energy absorbing material. An energy absorbing material is desired in high impact loading applications. Of course, since the belt supports are spaced apart from one another, the belt 11 can deflect to absorb impact forces, thereby reducing damage to the belt.

As previously mentioned, the return roller 20 contacting the return side 1 lb of the belt 11 in the prior art is generally held or attached to the belt support frame 14 by brackets at each end of the roller fixed to opposite sides of the belt support structure to support the return roller. Since the return roller supports the belt on the return side of the belt, which has conveyed the aggregate material, it operates in a hostile environment, requiring periodic replacement or servicing of the roller, as the bearings can fail so the roller does not turn and, accordingly, wears the belt. The present apparatus facilitates an arrangement for easily replacing or servicing the return roller 20 from one side of the conveyor belt system 10.

Figure 14:
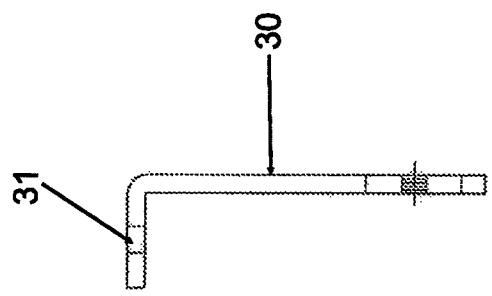
FIG. 14 is a side elevational view of the example mounting bracket of FIG. 12.

Referring to FIGS. 2, 3, and 4, the details of the support structure 25 for the return rollers 20 is shown. When the need arises to replace or otherwise service roller 20, the return roller structure 25 of the present arrangement allows the roller 20 to be disengaged by releasable support apparatus 25 from its normal operation position and removed from the conveyor system 10 from one side of the conveyor system. The structure for holding the return roller 20 in position includes a tubular member or hollow shaft 21, which is received and supported on a mandrel or shaft 22, as shown more specifically in FIGS. 2, 5 and 7. The mandrel 22 is fixed to a bracket 23, as by welding, and the bracket 23 is fixed to the belt support frame 14, preferably by being bolted to the belt support structure 14. The bracket and mandrel arrangement is shown more clearly in FIGS. 14-16. Slots are provided in the upper portion of the bracket 23 for receiving bolts threaded into or through the belt support frame 14. In this manner, the mandrel 21 is held fixed and stationary relative to the belt support frame 14.

As shown most clearly in FIGS. 2, 3, 5 and 7, the return roller structure 25 includes the tubular member 21, which slides over and onto the mandrel shaft 22 until it is adjacent the mounting bracket 23 at the far side of the conveyor belt structure 10, 14. The return roller structure 25 further includes brackets 26 and 27, which are fixed to and extend outwardly from the tubular member 21 to opposite ends of a central shaft 20a through the return roller 20. As shown in FIGS. 10 and 11, the brackets 26 and 27 are provided with notches 26a and 27a to receive the opposite ends of the shaft 20a through the return roller. The return roller shaft 20*a* is held in the notches 28*a*, 29*a* by shaft retainers 28 and 29, respectively, which are fixed to the brackets 26 and 27, as by screws, through the openings, such as opening 28*a* in retainer 28 mating with an opening 26*b* in the bracket 26. The openings 28*a* and 26*b* are adapted to receive a screw to hold the parts 26, 28 and 27, 29 together and the shaft 20*a* of the return roller 20 in place. The retainer 29 is arranged similarly to the retainer 28, and is held to bracket 27 for capturing and holding the opposite end of the shaft 20*a* of the return roller 20.

Figure 13:
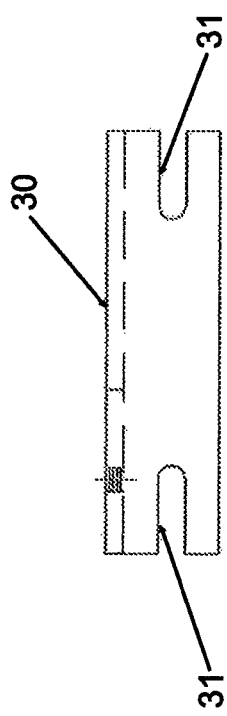
FIG. 13 is a top view of the example mounting bracket of FIG. 12.
Figure 12:
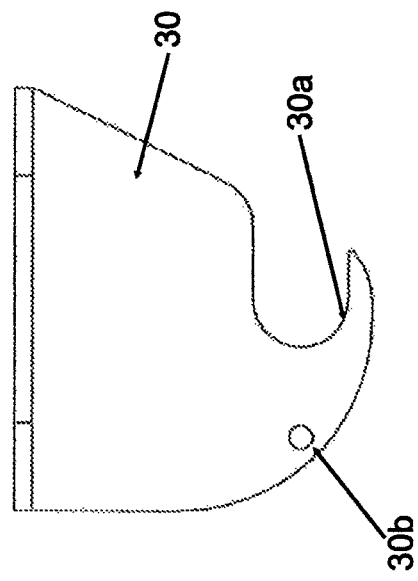
FIG. 12 is a side elevational view of the example mounting bracket which supports the free end of the return roller.

The accessible or free end of the return roller structure 25 is supported by releasable support apparatus generally designated 25*a* at the free end of the mandrel 22. More specifically, the return roller structure 25 is supported at its free end in a notch or recess 30*a* of bracket 30, as shown in FIGS. 3, 6 and 9. Bracket 30 is shown most clearly in FIGS. 11, 12 and 13 and is provided at its top section with slots 31 for receiving screws to fix bracket 30 to the belt support frame 14, as shown in FIG. 2. As shown in FIGS. 2, 3, 5 and 6, a rotatable member shown as a lever or crank 32, is fixed to the free or accessible end of the tubular member 21 of the return roller structure 25. The lever 32 is provided with a handle 33 for rotating the lever and the return roller structure about the mandrel 22.

Figure 5:
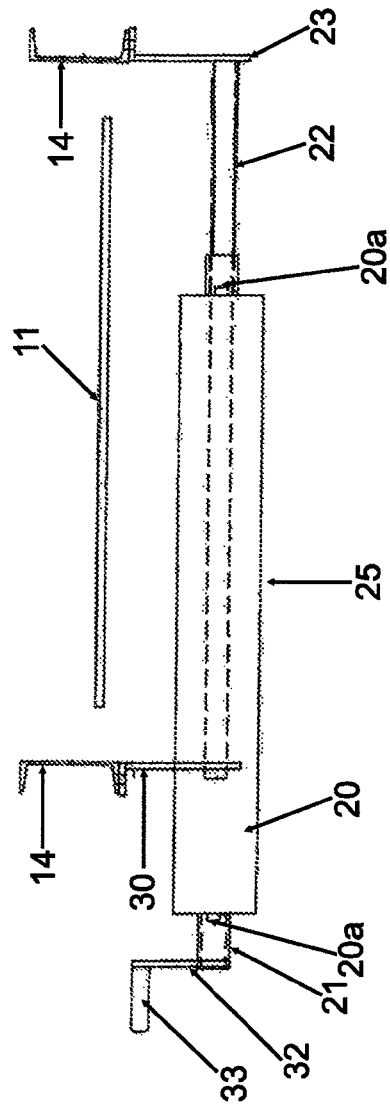
FIG. 5 is a fragmentary, exploded view of a portion of the example conveyor assembly of FIG. 2 showing the return roller structure being removed.
Figure 6:
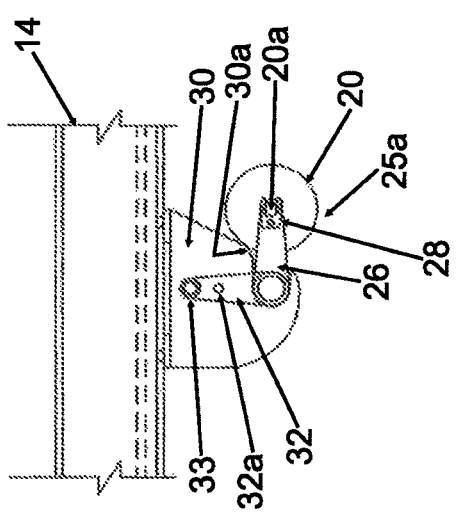
FIG. 6 is a fragmentary side elevational view of the example conveyor assembly of FIG. 5 showing the return roller being removed.

In this arrangement, as indicated in FIGS. 5 and 6, the tubular member 21 of the return roller structure 25 is slid onto the mandrel 22 with the return roller 20 being free to pass by bracket 30 and be slid onto or off of the mandrel 22. When the tubular member 21 is adjacent bracket 23, the return roller structure 25 is then rotated into operative position, as shown in FIG. 2, to support the under side 1*lb* of the conveyor belt 11. When the return roller structure is rotated into its operative position to support the conveyor belt 11 by the handle 33 on the lever 32, the lever 32 is locked into position as by a locking mechanism 34. In the arrangement shown, the locking mechanism includes a cap screw 34 passing through opening 32*a* in the lever mating with opening 30*b* in the bracket 30, as shown in FIGS. 2 and 6. More specifically, the cap screw would be threaded into the openings 32*a* and 30*b* for locking the return roller structure 25 fixed to support bracket 30 for maintaining the return roller structure 25 in operative position for supporting the conveyor belt 11, e.g., with return roller 20 supporting the return side 11*b* of conveyor belt 11.

Figure 7:
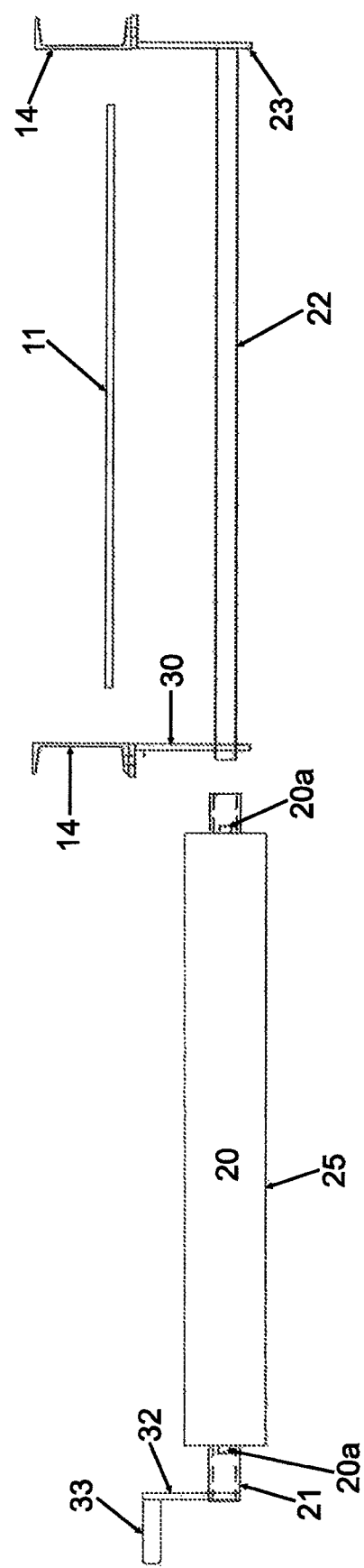
FIG. 7 is a further view of the example return roller and its support assembly similar to FIG. 5, but showing the return roller completely removed from the support shaft.

When it is desired to remove or service the return roller 20, the cap screw 34 in FIG. 3 would be removed permitting the lever 32 to be rotated moving the return roller structure 20, 25 from its operative position to be rotated about mandrel 22 to the position shown in FIGS. 5 and 6. The return roller structure 25 is then slid off the mandrel 22 as shown in FIG. 5 with the return roller 20 bypassing support bracket 30 for complete removal from the mandrel 22, as shown in FIGS. 7 and 8. In this manner, the return roller 20 is permitted to be easily removed from the mandrel 22 and to be replaced on the mandrel 22 and be returned to its operative position.

The present arrangement thus provides an effective, efficient and safe manner to service the return roller 20 from one (i.e. a near) side of the conveyor belt structure 10, 11, 14, avoiding the necessity for access to the return roller support structure from the opposite (far) side of the conveyor belt 11. It will be recognized by those skilled in the art that changes and modifications can be made to the above described embodiment without departing from the broad inventive concept of the arrangement. For example various parts can be fixed together by a wide variety of means known to those skilled in the art. It should be understood that this arrangement is not limited to the particular embodiment described herein but is intended to include all changes and modifications that are within the scope and spirit of the invention as set forth in the following claims.

Referring to the drawing, FIGS. 18-21 illustrate an example embodiment including various features intended to render the present arrangement more easily usable in a variety of situations. The function and operation of this embodiment, e.g., roller support structure 25', installation and removal thereof, positioning of roller 20, and the like, is substantially the same as described herein above; several additional features are provided. As above, the roller support structure is installable and removable from the near side of conveyor belt 11 without the need to access the far side thereof; the "near side" can be either at the right edge or the left edge of conveyor belt 11 as may be convenient depending upon the way a particular conveyor system 10 is installed at a particular site, most often at the side at which a catwalk, a fixed or movable platform, or another access platform is provided.

Figure 18:
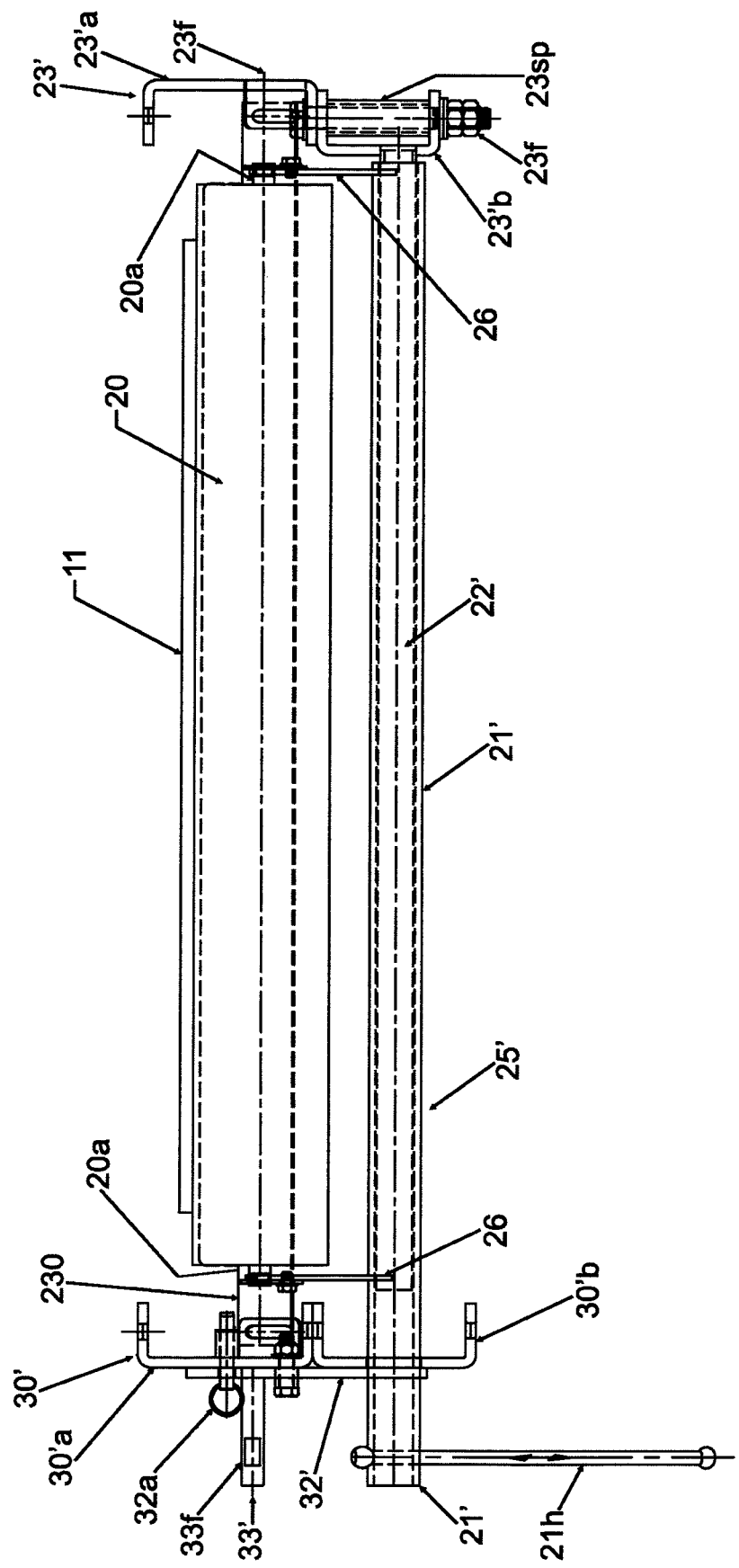
FIG. 18 is a an enlarged sectional view of another example conveyor assembly according to the present arrangement.
Figure 18A:
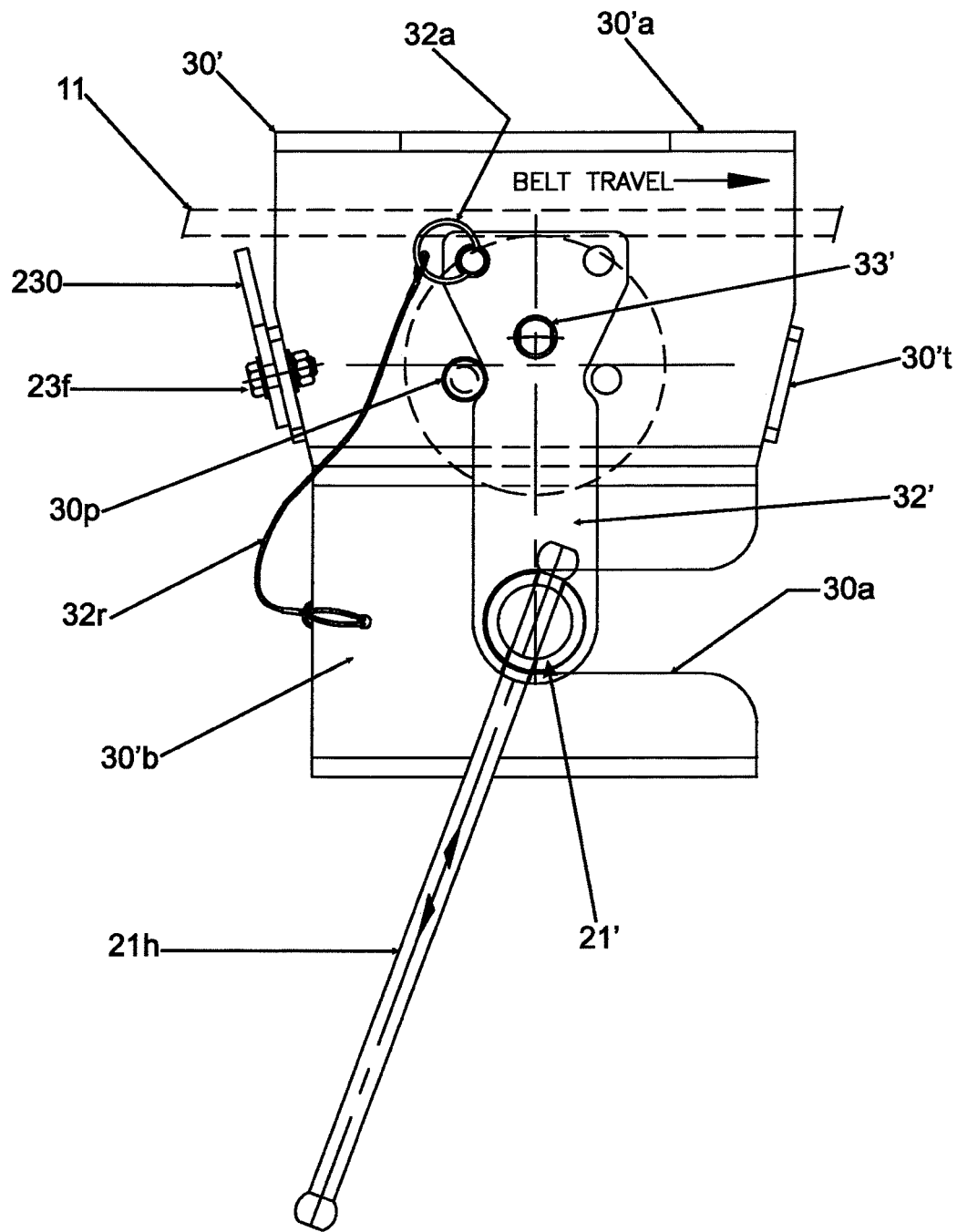
FIGS. 18A and 18B are left and right side elevations of the example return roller arrangement of FIG. 18.
Figure 18B:
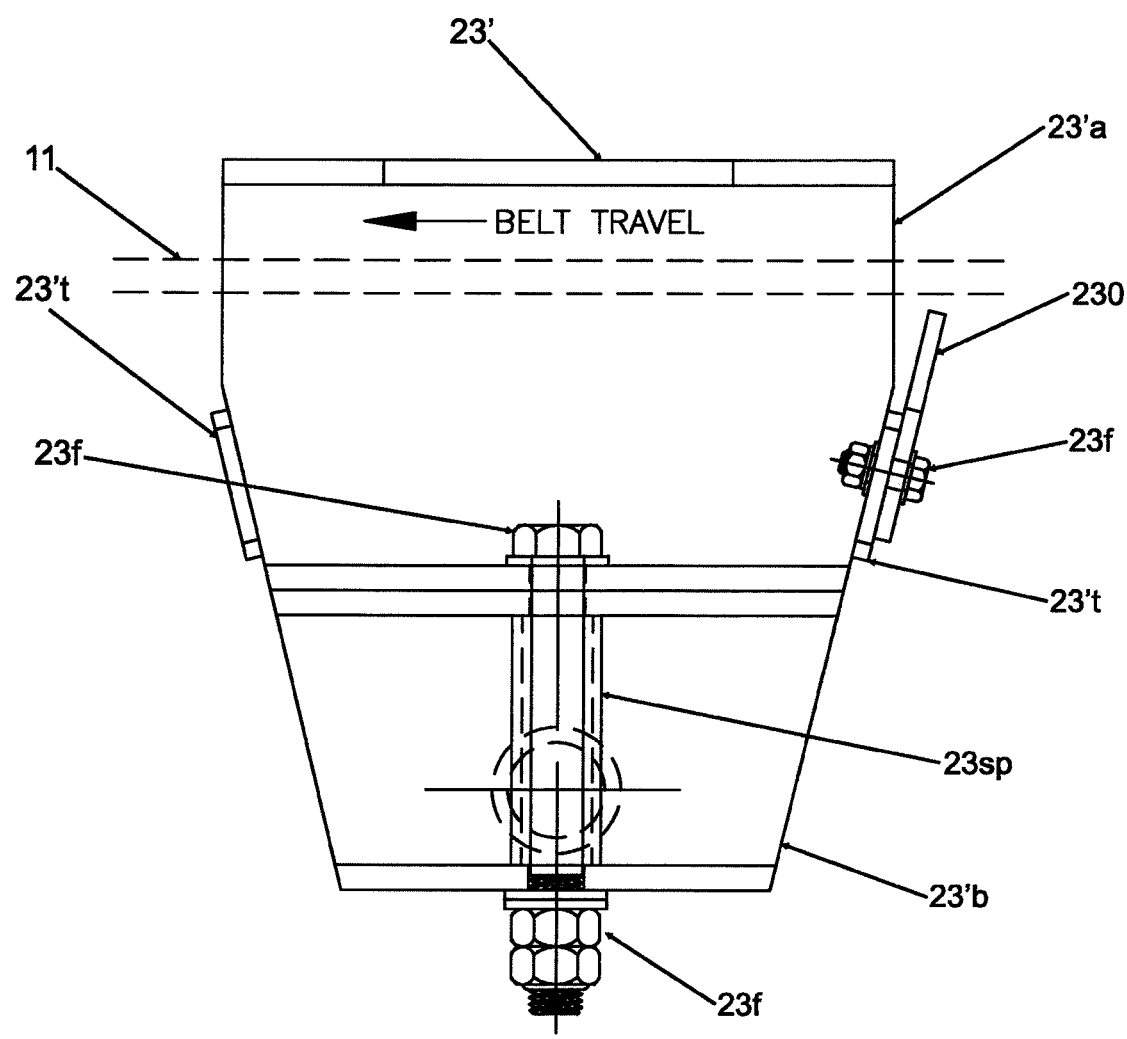

In the enlarged sectional view and elevations of FIGS. 18, 18A and 18B, roller support structure 25' is illustrated positioning return roller 20 in its operative position supporting conveyor belt 11, wherein roller 20 is rotatable on its shaft 20*a* which is spaced away from tubular member 22' and supported thereon by support brackets 26. The far side end of rotatable hollow tubular member 21' slips onto mandrel or shaft 22' which is supported at the far side of conveyor belt 11 by mounting bracket 23' which is attached to the support frame of conveyor system 10. The near side end of tubular member 21' is supported in slot 30*a* of mounting bracket 30' which is attached to the support frame 14 of conveyor system 10.

Return roller shaft 20*a* is retained in roller supports 26 by roller shaft retainers 28, 29 so that return roller 20 is replaceable when roller structure 25' is removed from mandrel 22'. Retainers 28, 29 are described above.

Near side tubular member support bracket 30' includes an upper near side bracket 30'*a* which may be attached to the support structure 14 of conveyor system 10 and which supports a lower near side bracket 30'*b* having a notch or slot 30*a* into which tubular member 22' is placed to be supported thereby. Both near side brackets 30'*a*, 30'*b* are vertically symmetric so as to be usable "universally," i.e. at either the right or left edges of conveyor belt 11. Both brackets 30'*a*, 30'*b* are "C-shaped" having respective holes therein for receiving fasteners for attaching upper near side bracket 30'*a* to conveyor system 10 and for attaching lower near side bracket 30'*b* to upper near side bracket 30'*a*. Upper bracket 30'*a* has a pair of mounting tabs 30'*t* for supporting one end of a belt support bar 23*s*, described below.

Far side mandrel support bracket 23' includes an upper far side bracket 23'*a* which may be attached to the support structure 14 of conveyor system 10 and which supports a lower far side bracket 23'*b* which supports mandrel or shaft 21'. Both far side brackets 23'*a*, 23'*b* are vertically symmetric so as to be usable "universally," i.e. at either the right or left edges of conveyor belt 11. Both far side brackets 23'*a*, 23'*b* are "C-shaped" having respective holes therein for receiving fasteners for attaching upper far side bracket 23'*a* to conveyor system 10 and for attaching lower far side bracket 23'*b* to upper far side bracket 23'*a*. Upper bracket 23'*a* has a pair of mounting tabs 30'*t* for supporting one end of a belt support bar 23*s*, described below.

Figure 19:
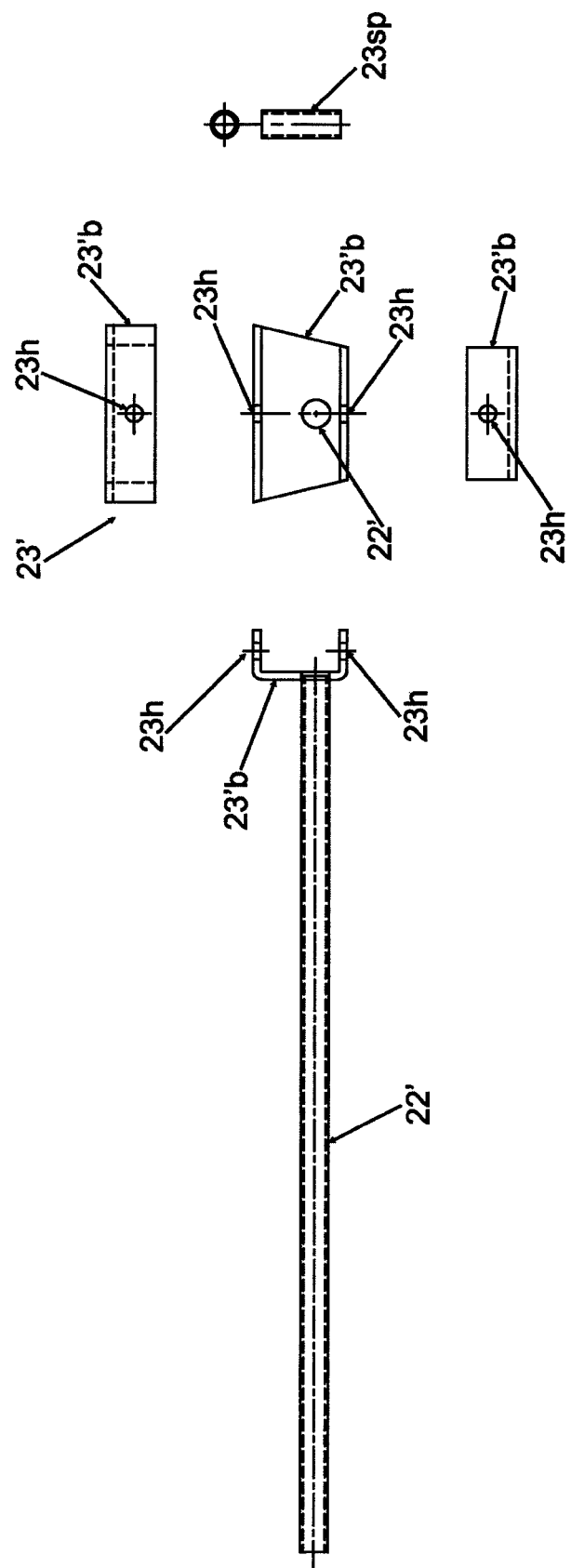
FIG. 19 includes views of the support mandrel and its support bracket.

Referring to FIGS. 18, 18B and 19, lower far side bracket 23'*b* is attached to upper far side bracket 23'*a* by a fastener 23*f*, e.g., preferably a bolt and nut or nuts 23*f*, which passes through a hole 23*h* in each of the flanges of C-shaped bracket 23'*b* and through a cylindrical spacer 23*sp*, so that bracket 23'*b* is rotatable on fastener 23*f* relative to upper bracket 23'*a*.

For example, nut 32f may be a locknut or nuts 32f may be two nuts tightened against each other to be a locknut. Mandrel or shaft 22' is affixed to bracket 23'b, e.g., as by welding or fastener, and mandrel 22' may be pivoted relative to conveyor belt 11 with corresponding rotation of lower bracket 23'b so as to move mandrel 22' to a more convenient position for placing tubular member 21' thereon or removing member 21' therefrom. For example, the near end of mandrel 22' may be pivoted away from near side support bracket 30' to provide additional clearance for facilitating the sliding of tubular member 21' on and off mandrel 22'. With fastener 23f and spacer 23sp rotatable about an axis generally perpendicular to a plane defined by conveyor belt 11, mandrel 22' is pivotable in a plane generally parallel to the plane of conveyor belt 11.

Figure 20:
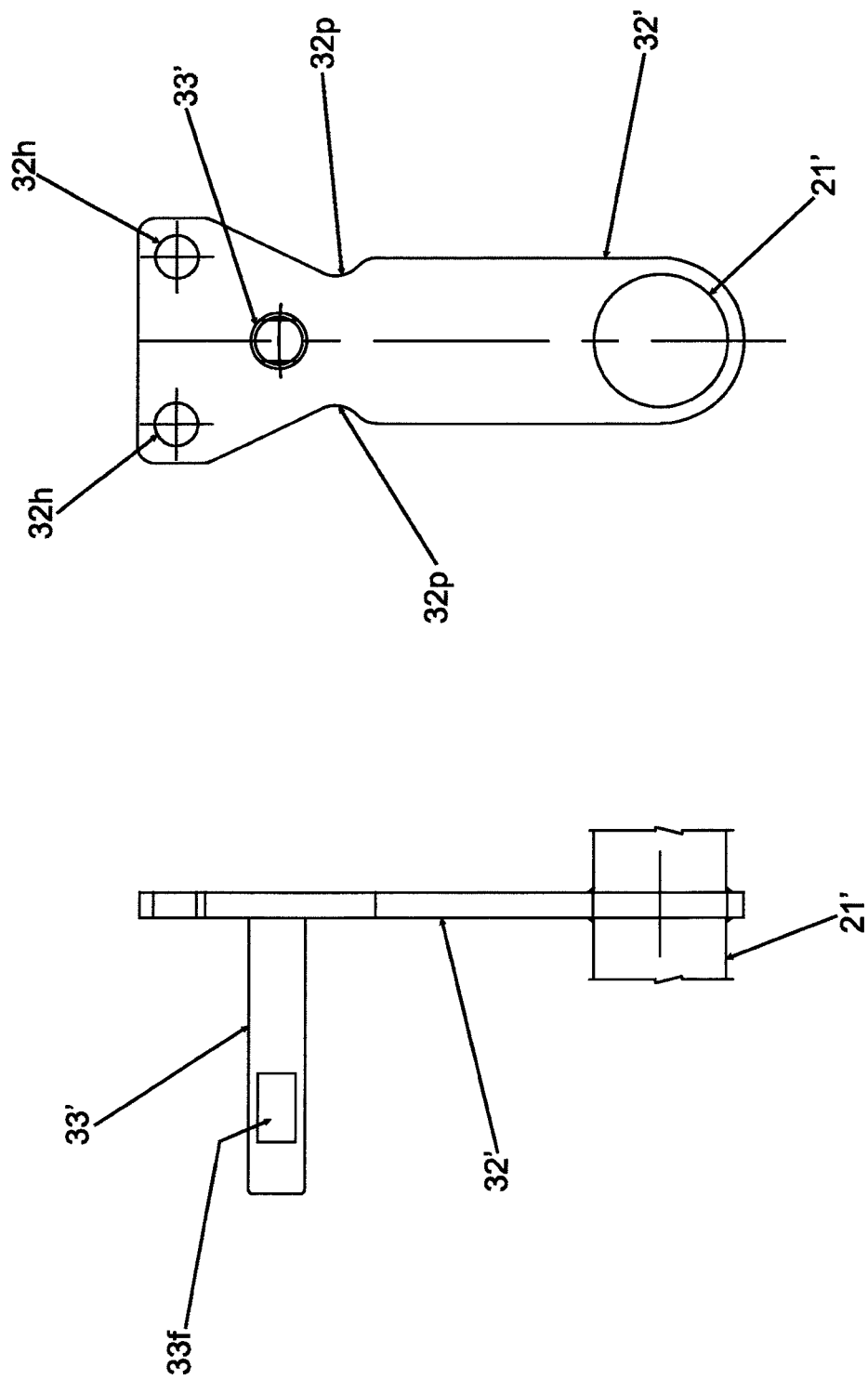
FIG. 20 includes views of an example crank handle for the example roller of FIG. 18.

Referring to FIGS. 18, 18A and 20, an example crank handle 32', 33' for the example roller of FIG. 18 includes a flat symmetric crank or lever 32' attached at one end to tubular member 21', e.g., as by welding, and having a handle 33' extending from near an opposite end thereof. Handle 33' may be moved for using the leverage provided by crank 32' for moving roller 20 to its operative position supporting conveyor belt 11 and out of its operative position to a servicing position wherein tubular member 21' may be installed and removed from mandrel 22', similarly to that described above. In addition, handle 33' has at least one set of opposing flats thereon providing for the placing of a wrench thereon for increasing the force that can be applied via crank 32' for moving roller 20 into and out of its operative position.

Crank 32' is preferably symmetric about an axis passing through handle 33' and member 21' so that it is a "universal" crank lever or handle, i.e. one that can be utilized with a right handed bracket 30, with a left handed bracket 30 and with "universal" bracket 30' in either a right hand or left hand installation. One of the pair of positioning features 32p, e.g., indentations 32p, comes proximate to a pin 30p in universal bracket 30'a when handle 32', 33' is moved to a position wherein roller 20 is in its operative position supporting conveyor belt 11, thereby to provide a handle stop. In that handle stop position, one of holes 32h is aligned with a corresponding hole in upper bracket 30'a and a locking pin 32a, locking bolt 32a, or other member 32a can be placed through hole 32h into bracket 30'a thereby to provide a locking mechanism. A quick release locking pin 32a is preferred because it can be inserted and removed to lock handle 32' in place without use of a tool. A lanyard or other retainer 32r may be provided so that pin 32a is retained when it is not inserted through a hole 32h into bracket 30' and so is not easily lost.

In addition, tubular member 21' may be provided with a transverse handle 21h, sometimes called a roller engaging rod, that preferably is longer than is crank 32' for facilitating the application of additional rotational force for moving roller 20 into and out of its operative position supporting conveyor belt 11. Handle 21h or engaging rod 21h preferably is slidable in a transverse hole through member 21' and has enlarged ends for being retained in that hole in member 21', for ease of use, similarly to the handle of a vise or clamp.

Figure 21:
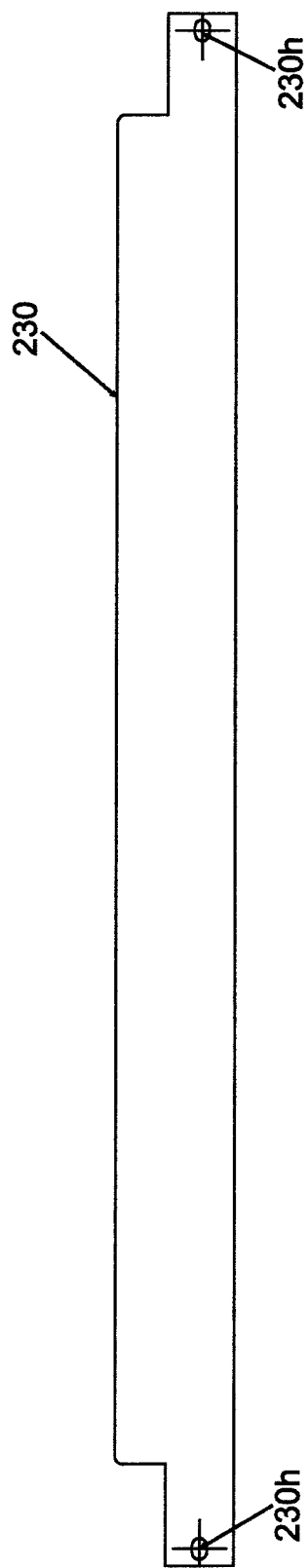
FIG. 21 is an elevation view of an example belt support usable with the example return roller arrangement of FIG. 1 or 18.

Referring to FIGS. 18, 18B and 21, an example belt support bar 230 usable with the example return roller arrangement 25' may be provided for supporting conveyor belt 11 when roller 20 is moved from its operative position supporting conveyor belt 11. There is normally no problem of the conveyor belt 11 rubbing on belt support bar 230 because normal safety procedures, as well as common sense, require that conveyor system 10 be shut down, i.e. that belt 11 be stopped, when servicing elements of conveyor system 10 that are close to moving conveyor belt 11.

Belt support bar 230 is supported at its respective ends by fasteners 23f through holes 230h attaching belt support bar 230 to the appropriate respective tabs 23t, 30t of brackets 23', 30'. Belt support bar 230 is preferably located at the side of brackets 23', 30' from which belt 11 travels towards roller 20, and is preferably positioned a small distance, e.g., about one-quarter inch below conveyor belt 11 when roller 20 is in its operative position, so as to provide protection against a worker's finger or hand being pinched between roller 20 and belt 11, e.g., providing a pinch point guard. Belt support bar 230 thus supports belt 11 only a small distance below its normal operating location, thereby reducing the force needed to move roller 20 into and/or out of its operative position, because roller 20 only needs to lift belt 11 a small distance.

A conveyor assembly 10 may comprise: a continuous conveyor belt 11 extending about a head pulley 12 and a tail pulley 13 to have a carry side 11a and a return side 11b for the belt 11, wherein the conveyor assembly 10 has a loading zone 16 where material is loaded onto the carry side 11a of the belt 11 and a transport zone between the loading zone 16 and the head pulley 12; a plurality of conveyor belt supports 19 positioned along the length of the belt 11 for supporting carry and return sides 11a, 11b of the conveyor belt 11, the conveyor belt support 25 may comprise: a return roller structure 25 extending across the width of the belt 11 and supported by a belt support on one side of the conveyor assembly 10; a return roller 20 on the return roller structure 25; a releasable support apparatus 25a adapted to support the other side of the return roller structure 25 on the opposite side of the conveyor assembly 10, whereby upon release of the releasable support apparatus 25a, the return roller structure 25 can be removed from the opposite side of the conveyor assembly 10. The belt support 19 may include a shaft 22 supported by the belt support 19 on the one side of the conveyor assembly 10 and extending to the opposite side of the conveyor assembly 10, the shaft 22 being adapted to slidably receive the return roller structure 25a from the opposite side of the conveyor assembly 10. The return roller support 25a may include a tubular member 21 adapted to be received on the shaft 22. The releasable support apparatus 25a may include a holding bracket 30 having a recess 30a adapted to have the return roller structure 25a pass through the recess 30a onto the shaft 22 for supporting the end of the return roller structure 25a, when the return roller 20 is moved into operative position to support the return side 11b of the belt 11. The releasable support apparatus 25a may further include a rotatable member 21 for rotating the return roller structure 25a to have the return roller 20 in operative position and a locking mechanism 34 for releasing holding the rotatable member 21 to the holding bracket 30, whereby when the locking mechanism 34 is released and the rotatable member 21 is rotated, the return roller structure 25a can be removed from the opposite side of the conveyor assembly 11. The belt support 19, 23' and the holding bracket 30, 30' may be a universal belt support 19, 23' and a universal holding bracket 30, 30', each thereby being mountable one on a left side and the other on a right side of the conveyor assembly 10; or the shaft 22, 22' supported by the belt support 19, 23' may be pivotable generally parallel to the conveyor belt 11; or a belt support bar 230 may be positioned between the belt support 19, 23' and the holding bracket 30, 30' to support the conveyor belt 11 when the return roller 20 is not in the operative position; or the tubular member 21, 21' may include an engaging rod 21h slidable in a transverse hole through the tubular member 21, 21; or the rotatable member 21, 21' may include a handle 33, 33' having flats 33f thereon; or the locking mechanism 34 may include a quick release pin 32a; or any combination of any or all of the foregoing.

For a conveyor 10 comprising a continuous conveyor belt 11 extending about a head pulley 12 and a tail pulley 13 to have a carry side 11a and a return side 11b, the conveyor 10 having a near side near one edge of the conveyor belt 11 and a far side near an opposite edge of the conveyor belt 11, a conveyor belt support 19, 25, 25' may comprise: a support mandrel 22, 22' mountable to the far side of the conveyor 10 and extending transversely toward the near side thereof; a rotatable member 21, 21' slidably and rotatably mountable to the support mandrel 22, 22' from the near side of the conveyor 10 for sliding thereon in a direction transverse to the conveyor belt 11 and for rotating about the support mandrel 22, 22'; and a roller 20 rotatable on a roller shaft 20a and supported by the rotatable member 21, 21', wherein the roller 20 is transverse to the conveyor belt 11 when the rotatable member 21, 21' is mounted to the support mandrel 22, 22'; wherein rotating the rotatable member 21, 21' in a first direction relative to the support mandrel 22, 22' moves the roller 20 to an operating position for supporting the conveyor belt 11 and rotating the rotatable member 21, 21' in a second direction relative to the support mandrel 22, 22' moves the roller 20 away from the operating position to a position wherein the rotatable member 21, 21' with the roller 20 thereon is slidably removable from the support mandrel 22, 22'. The rotatable member 21, 21', may be a hollow member 21, 21' that slides onto the support mandrel 22, 22' for providing the slidable and rotatable mounting. The rotatable member 21, 21' may include brackets 26 extending therefrom for supporting the roller shaft 20a. Roller shaft 20a may be retained to the brackets 26 by locking retainers 28, 29. The rotatable member 21, 21' may include: a crank 32, 32' for rotating the rotatable member 21, 21'; or an engaging rod 21h slidable in a transverse hole through the rotatable member 21, 21' for rotating the rotatable member 21, 21; or a crank 32, 32' and an engaging rod 21h for rotating the rotatable member 21, 21'. The crank 32, 32' may include: a lever 32, 32' and a handle 33, 33; or a lever 32, 32' and a handle 33, 33' having flats 33f thereon. The crank 32, 32' may have a positioning feature 32p defining a locking position; or may have an opening 30b, 32h for receiving a locking device 34, 32a therein; or may have an opening 30b, 32h for receiving a quick release locking pin 32a therein; or may be symmetric for being usable in a right handed installation and in a left handed installation; or any combination of the foregoing. The conveyor belt support 19, 25, 25' may further comprise a bracket 23, 23' attachable to a conveyor frame 14 at the far side of the conveyor 10 for supporting the support mandrel 22, 22' transversely to the conveyor belt 11. The bracket 23, 23' may pivotably support the support mandrel 22, 22' wherein the support mandrel 22, 22' is pivotable generally parallel to the conveyor belt 11; or may be universal for being usable in a right handed installation and in a left handed installation; or may pivotably support the support mandrel 22, 22' wherein the support mandrel 22, 22' is pivotable generally parallel to the conveyor belt 11 and the bracket 23, 23' is universal for being usable in a right handed installation and in a left handed installation. The conveyor belt support 19, 25, 25' may further comprise a bracket 30, 30' attached to a conveyor frame 14 at the near side of the conveyor 10 and having a notch 30a for receiving the rotatable member 21, 21' therein. The bracket 30, 30' may have a hole 30b, 30h for receiving a locking device 34, 32a for locking the rotatable member 22, 22' in a position with the roller 20 in the operating position; or may be universal for being usable in a right handed installation and in a left handed installation; or may have a hole 30b, 32a for receiving a locking device 34, 32a for locking the rotatable member 22, 22' in a position with the roller 20 in the operating position and the bracket 30, 30' may be universal for being usable in a right handed installation and in a left handed installation. The conveyor belt support 19, 25, 25' may further comprise a belt support bar 230 positioned to support the conveyor belt 11 when the roller 20 is not in the operating position.

A conveyor belt support 19, 25, 25' for a conveyor 10 comprising a continuous conveyor belt 11 extending about a head pulley 12 and a tail pulley 13 to have a carry side 11a and a return side 11b, the conveyor 10 having a near side near one edge of the conveyor belt 11 and a far side near an opposite edge of the conveyor belt 11, the conveyor belt support 19, 25, 25' may comprise: a support mandrel 22, 22' mountable to the far side of the conveyor 10 and extending transversely toward the near side thereof, wherein the support mandrel 22, 22' is attached to a conveyor frame 14 at the far side of the conveyor 10 for supporting the support mandrel 22, 22' transversely to the conveyor belt 11; a hollow member 21, 21' slidably and rotatably mountable to the support mandrel 22, 22' from the near side of the conveyor 10 for sliding thereon in a direction transverse to the conveyor belt 11 and for rotating about the support mandrel 22, 22; a crank 32, 32' attached to the hollow member 21, 21' for rotating the hollow member 21, 21' about the support mandrel 22, 22; and a roller 20 rotatable on a roller shaft 20a and supported by the hollow member 21, 21', wherein the roller 20 is transverse to the conveyor belt 11 when the hollow member 21, 21' is mounted to the support mandrel 22, 22; wherein moving the crank 32, 32' to rotate the hollow member 21, 21' in a first direction relative to the support mandrel 22, 22' moves the roller 20 to an operating position for supporting the conveyor belt 11 and rotating the crank 32, 32' to rotate the hollow member 21, 21' in a second direction relative to the support mandrel 22, 22' moves the roller 20 away from the operating position to a position wherein the hollow member 21, 21' with the roller 20 thereon is slidably removable from the support mandrel 22, 22'. The hollow member 21, 21' may be a tubular member 21, 21' that slides onto the support mandrel 22, 22' for providing the slidable and rotatable mounting. The hollow member 21, 21' may include: brackets 26 extending from the hollow member 21, 21' for supporting the roller shaft 20a; or an engaging rod 21h slidable in a transverse hole through the hollow member 21, 21' for rotating the hollow member 21, 21; or brackets 26 extending from the hollow member 21, 21' for supporting the roller shaft 20a and an engaging rod 21h slidable in a hole through the hollow member 21, 21' for rotating the hollow member 21, 21'. The roller shaft 20a may be retained to the brackets 26 by locking retainers 28, 29. The crank 32, 32' may include: a lever 32, 32' and a handle 33, 33; or a lever 32, 32' and a handle 33, 33' having flats 33f thereon. The crank 32, 32' may have a positioning feature 32p defining a locking position; or may have an opening 32h for receiving a locking device 34, 32a therein; or the crank 32, 32' may have an opening 32h for receiving a quick release locking pin 32a therein; or the crank 32, 32' may be symmetric for being usable in a right handed installation and in a left handed installation; or any combination of the foregoing. The conveyor belt support 19, 25, 25' may further comprise a bracket 23, 23' attachable to a conveyor frame 14 at the far side of the conveyor 10 for supporting the support mandrel 22, 22' transversely to the conveyor belt 11. The bracket 23, 23' may pivotably support the support mandrel 22, 22' wherein the support mandrel 22, 22' is pivotable generally parallel to the conveyor belt 11; Or may be universal for being usable in a right handed installation and in a left handed installation; or may pivotably support the support mandrel 22, 22' wherein the support mandrel 22, 22' is pivotable generally parallel to the conveyor belt 11 and may be universal for being usable in a right handed installation and in a left handed installation. The conveyor belt support 19, 25, 25' may further comprise a bracket 30, 30' attached to the conveyor frame 14 at the near side of the conveyor 10 and may have a notch 30a for receiving the hollow member 21, 21' therein. The conveyor belt support 19, 25, 25' may further comprise a belt support bar 230 positioned to support the conveyor belt 11 when the roller 20 is not in the operating position.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "front," "rear," "side," "top," "bottom," "forward," "backward," "under" and/or "over," may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

While the present invention has been described in terms of the foregoing example embodiments, variations within the scope and spirit of the present invention as defined by the claims following will be apparent to those skilled in the art. For example, while features such as a belt support bar 230, a pivotable mandrel 22', an engaging rod 21h, universal brackets 23', 30', universal handle 32', handle flats 33f, are described in relation to the embodiment of FIGS. 18-21, some or all of such features may be employed in the embodiment of FIGS. 2-17, as may be desired in a particular instance.

Although roller support structure 25, 25' is described in terms of an example conveyor system 10 wherein the roller is a return roller supporting the return side of conveyor belt 11, roller support structure 25, 25' could be located between the carry and return sides of conveyor belt 11 so as to support a roller that supports the carry side of conveyor belt 11. While roller 20 is illustrated as being generally cylindrical, it can be barrel shaped or otherwise non-cylindrical.

While bracket 23'b is shown as being pivotable relative to bracket 23'a, bracket 23'b could be fixed to bracket 23'a and mandrel 22' could itself pivot relative to bracket 23', e.g., by being affixed to spacer 23sp which is rotatable on fastener 23f. In such case, bracket 23'b could be reversed so that spacer 23sp is exposed towards conveyor belt 11 or bracket 23'b could have a slot therein through which mandrel 22' passes to attach to spacer 23sp.

Crank 32, 32' may be sized to space handle 33, 33' away from tubular member 21, 21' about the same distance as roller support shaft 20a is spaced away therefrom as illustrated, or may be sized to provide a greater spacing away of handle 33, 33' where additional leverage is desired for placing or removing roller 20 from its operative position or may be sized to provide lesser spacing away of handle 33, 33'.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A conveyor assembly comprising:
(1) a continuous conveyor belt extending about a head pulley and a tail pulley to have a carry side and a return side for the belt, wherein the conveyor assembly has a loading zone where material is loaded onto the carry side of the belt and a transport zone between the loading zone and the head pulley;
(2) a plurality of conveyor belt supports positioned along the length of the belt for supporting carry and return sides of the conveyor belt, the conveyor belt support comprising:
  (a) a return roller structure extending across the width of the belt and supported by a belt support on one side of the conveyor assembly;
  (b) a return roller extending across the width of the belt on the return roller structure;
  (c) a releasable support apparatus adapted to support the other side of the return roller structure on the opposite side of the conveyor assembly, whereby upon release of the releasable support apparatus, the return roller structure can be removed from the opposite side of the conveyor assembly.

2. The conveyor assembly of claim 1 in which the belt support includes a shaft supported by the belt support on the one side of the conveyor assembly and extending to the opposite side of the conveyor assembly, the shaft being adapted to slidably receive the return roller structure from the opposite side of the conveyor assembly.

3. The conveyor assembly of claim 2 in which the return roller structure includes a tubular member adapted to be received on the shaft.

4. A conveyor assembly comprising:
(1) a continuous conveyor belt extending about a head pulley and a tail pulley to have a carry side and a return side for the belt, wherein the conveyor assembly has a loading zone where material is loaded onto the carry side of the belt and a transport zone between the loading zone and the head pulley;
(2) a plurality of conveyor belt supports positioned along the length of the belt for supporting carry and return sides of the conveyor belt, the conveyor belt support comprising:
(a) a return roller structure extending across the width of the belt and supported by a belt support on one side of the conveyor assembly, the belt support including a shaft supported by the belt support on the one side of the conveyor assembly and extending to the opposite side of the conveyor assembly, the shaft being adapted to slidably receive the return roller structure from the opposite side of the conveyor assembly, the return roller structure including a tubular member adapted to be received on the shaft;
(b) a return roller on the return roller structure;
(c) a releasable support apparatus adapted to support the other side of the return roller structure on the opposite side of the conveyor assembly, the releasable support apparatus including a holding bracket having a recess adapted to have the return roller structure pass through the recess onto the shaft for supporting the end of the return roller structure, when the return roller is moved into operative position to support the return side of the belt, whereby upon release of the releasable support apparatus, the return roller structure can be removed from the opposite side of the conveyor assembly.

5. A mounting apparatus for a return roller, the mounting apparatus being positioned beneath a return side of a conveyor belt, the return side of the conveyor belt having a near side along one edge of the return side of the conveyor belt and a far side along an opposite edge of the return side of the conveyor belt, the mounting apparatus comprising a return roller support structure and a return roller supported on the return roller support structure, the return roller support structure and the return roller extending across the width of the belt, the mounting apparatus further comprising a releasable support apparatus adapted to retain the return roller structure on the near side of the return side of the conveyor belt, whereby release of the releasable support apparatus enables the return roller support structure to slide on the mounting apparatus in a direction towards the near side of the return side of the conveyor belt.

6. The mounting apparatus of claim 5, the return roller support structure orienting the return roller in an operative position wherein the return roller supports the return side of the conveyor belt, the return roller structure being moveable to orient the return roller in a nonoperative position wherein the return roller does not contact the return side of the conveyor belt.

7. A mounting apparatus for a return roller, the mounting apparatus being positioned beneath a return side of a conveyor belt, the mounting apparatus comprising an elongate member extending transverse to the return side of the conveyor belt, the elongate member having a first axis extending lengthwise along the elongate member, the mounting apparatus further comprising a return roller support structure mounted onto the elongate member, the return roller support structure having thereon a return roller rotatable about a return roller axis, the first axis being parallel to the return roller axis, the return roller support structure being moveable relative to the elongate member along the first axis.

8. The mounting apparatus of claim 7 wherein the elongate member is a mandrel.

9. The mounting apparatus of claim 8 wherein the mandrel is cylindrical.

10. The mounting apparatus of claim 9 wherein the return roller support structure includes a tubular member which is received and supported on the mandrel.

11. The mounting apparatus of claim 7, the return roller support structure being slidably moveable relative to the elongate member along the first axis.

12. The mounting apparatus of claim 7, further comprising a releasable support apparatus adapted to retain the return roller support structure on the near side of the return side of the conveyor belt, whereby release of the releasable support apparatus enables the return roller support structure to move relative to the elongate member along the first axis.

13. The mounting apparatus of claim 12 wherein the releasable support apparatus comprises a holding bracket having a recess adapted to have the return roller support structure pass through the recess onto the shaft for supporting the end of the return roller support structure.

14. The mounting apparatus of claim 12, whereby release of the releasable support apparatus further enables the return roller support structure to move from an operative position wherein the return roller supports and is aligned with the return side of the conveyor belt, to a nonoperative position wherein the return roller is not aligned with the return side of the conveyor belt.

15. The mounting apparatus of claim 14, wherein the return roller in the nonoperative position does not contact the return side of the conveyor belt.

\* \* \* \* \*